Aug. 14, 1934.  G. R. STEERE  1,970,153
CONTROL DEVICE FOR CHARGING MACHINES
Original Filed June 25, 1927  3 Sheets-Sheet 1
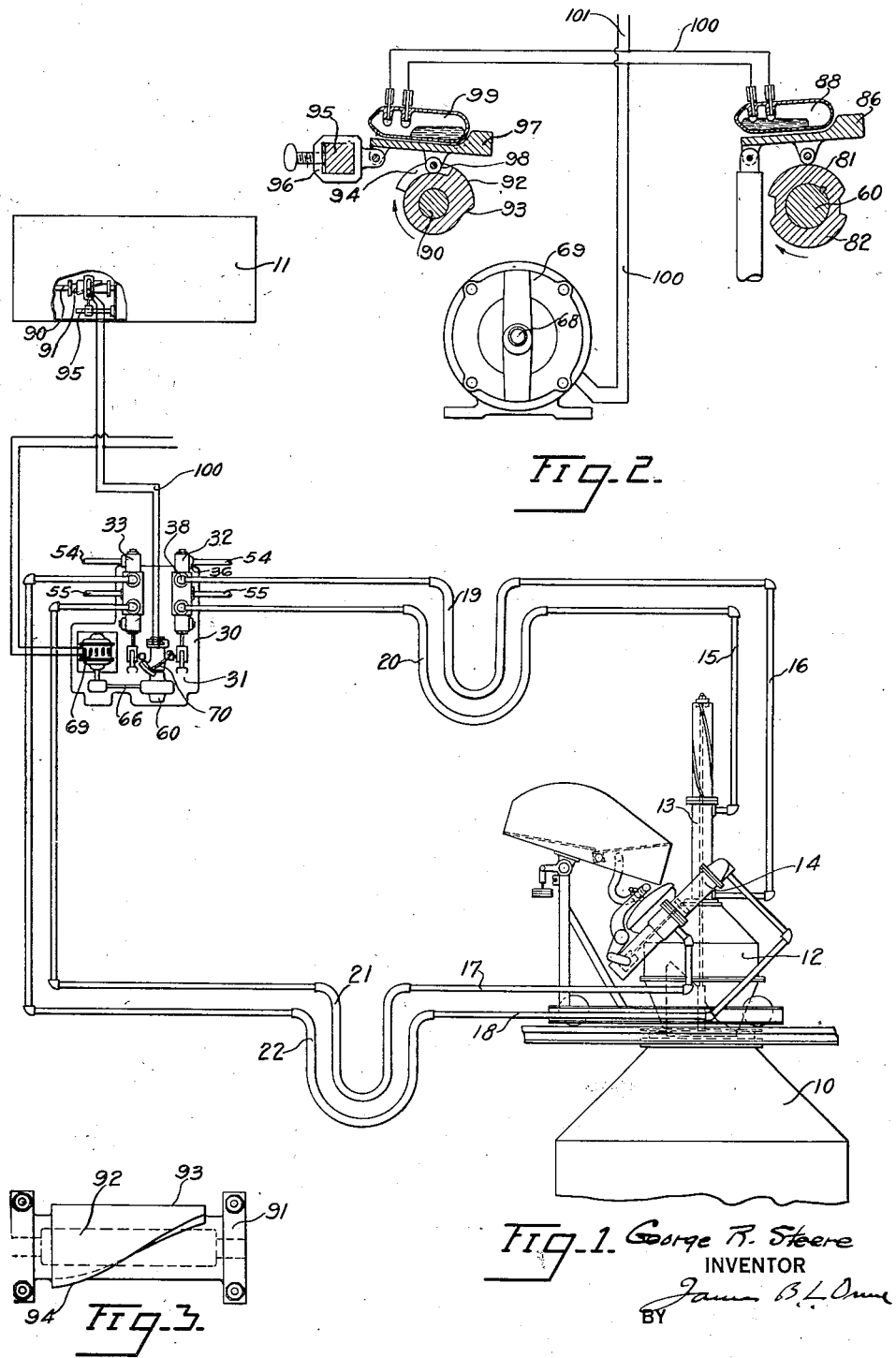

Aug. 14, 1934.  G. R. STEERE  1,970,153
CONTROL DEVICE FOR CHARGING MACHINES
Original Filed June 25, 1927  3 Sheets-Sheet 2

George R. Steere
INVENTOR
BY
ATTORNEY

Aug. 14, 1934.　　　G. R. STEERE　　　1,970,153
CONTROL DEVICE FOR CHARGING MACHINES
Original Filed June 25, 1927　　3 Sheets-Sheet 3

INVENTOR
GEORGE R. STEERE
BY
ATTORNEY

Patented Aug. 14, 1934

1,970,153

UNITED STATES PATENT OFFICE 1,970,153

CONTROL DEVICE FOR CHARGING MACHINES

George R. Steere, West Hartford, Conn., assignor to Semet-Solvay Engineering Corporation, New York, N. Y., a corporation of New York Application June 25, 1927, Serial No. 201,501
Renewed January 30, 1934

9 Claims. (Cl. 48—86)

This invention relates to control devices and more particularly to control devices for chargers that supply fuel or the like to gas generators and similar apparatus. The invention will be described hereinafter in connection with the charging of coke or coal to water gas generators, but it will be evident that it is applicable to the charging of other materials and with other apparatus.

In the generation of water gas it is desirable that the conditions of operation, and particularly conditions in the fuel bed, approach uniformity in order that variations in the product be avoided. Accordingly charging machines have been developed, for example as illustrated in the patent to Steere 1,608,680 granted November 30, 1926, which admit small charges of solid fuel at frequent intervals whereby the chilling effect and objectionable changes in the fuel bed due to the fresh charges of fuel are minimized. For a uniform gas production conditions of the fuel bed should be substantially the same for each steam run period of the generator, that is, the time cycle for charging coke or coal should be regular and, for the best results, in synchronism with that of the generator operation. However, with a manual control of the charger there is no assurance of regularity of its operation nor is it practical to maintain the operation in synchronism with the generator; and, if the operator's attention is distracted for but a brief period, the resulting change in the charging period may materially affect the quality of the gas produced.

According to the present invention a regularity of the charging period cycle is obtained by automatically controlling the charging mechanism, and its synchronous operation with that of the generator is secured by associating the charging control with the control nest with which a water gas generator set is usually equipped for automatically operating the valves that determine the air blast and steam run periods. The automatic control of the charger is obtained by providing motors for operating the movable elements, such as hydraulic cylinders or motors shown in the patent to Steere above mentioned, and control valves in the pipe lines leading to the motors. These valves can be operated to cause the operation of the hydraulic cylinders or motors at regular intervals by a power drive, such as an electric motor, through a suitable mechanism. For operating the charger control in synchronism with the gas generator set, a switch mechanism is preferably included in the generator control nest for starting the electric motor of the charger control at correct intervals; and a second switch mechanism connected in parallel therewith is preferably mounted in the charger control to insure a complete operation of the hydraulic cylinders or motors. Owing to variations in the character and size of the coal and other causes, blow holes or other defective conditions may occur in the fuel bed; provision is therefore made so that the charger can be manually operated to correct such conditions without affecting the automatic control or its regularity of operation.

The invention accordingly comprises a gas generator having a control nest for regulating the operation of the generator, a charger, a control for said charger and means associating the control nest with the charger control to synchronize the operation of the charger with that of the generator.

In the drawings, which accompany this specification,

Fig. 1 is a diagrammatic illustration of a preferred embodiment of the invention showing the generator of a water gas set, charger therefor, control nest for regulating the cycles of operation of the generator and the control mechanism for synchronizing the operation of the charger with that of the generator;

Fig. 2 is a view showing the electrical circuit and switch mechanisms associated with the electric motor drive of the charger control, one of the switches being operated from the control nest;

Fig. 3 is a detail of the cam designed to be mounted on the rotating shaft of the control nest to operate one of the switches shown in Figs. 1 and 2;

Figure 4:
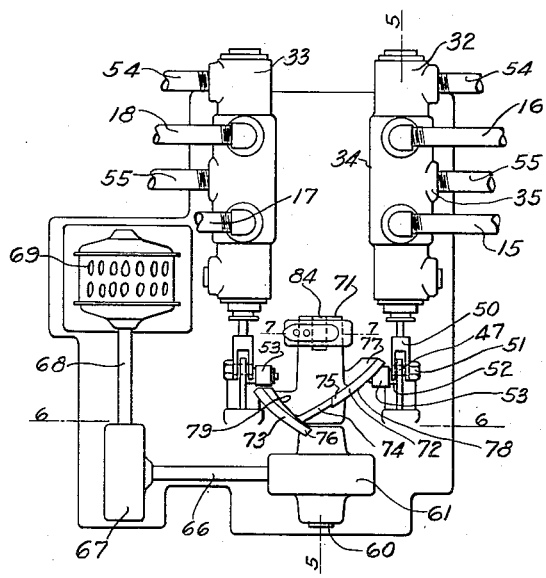
Fig. 4 is an enlarged plan view of the charger control.
Figure 7:
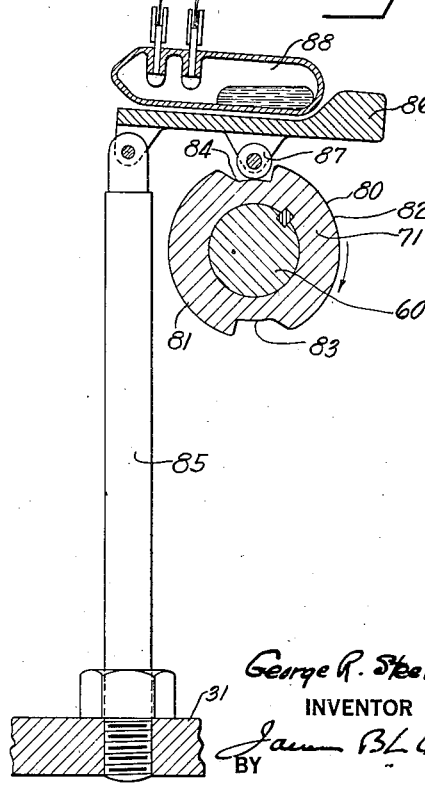
Figure 8:
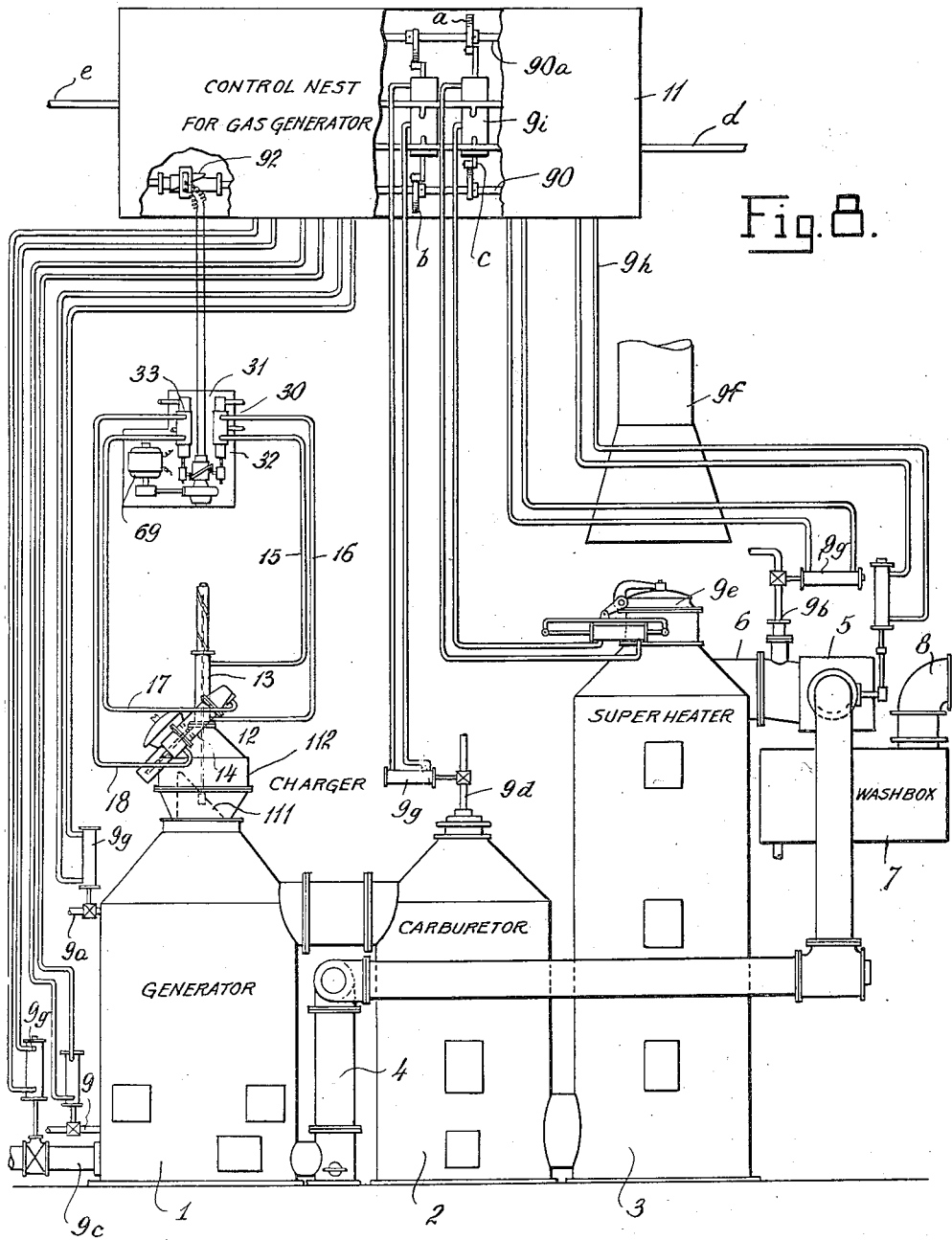

Fig. 7 is a detail elevation partly in section of a switch mechanism on the line 7—7 of Fig. 4; and Fig. 8 is a diagrammatic illustration of a preferred embodiment of the invention, showing the generator, carburetor, and superheater of a water gas set equipped with a control nest for regulating the operation of the water gas set in timed sequence with the control for regulating the operation of the charger for the gas generator of the set.

Referring to Figs. 1 and 8, there is shown a water gas set of a type now well known. This set is composed of a generator 1, carburetor 2, and superheater 3, connected in series. The backrun pipe 4 leads from the base of generator 1 into housing 5, into which also leads the gas offtake 6 from the superheater 3. A valve (not shown) is positioned in the housing 5 to control flow through the set and to place either the backrun pipe 4 or the superheater offtake 6 in communication with the washbox 7, equipped with the usual gas offtake 8.

The set is provided with the usual steam inlets 9, 9a, and 9b, inlet 9 being the uprun steam inlet;

9a, the downrun steam inlet; and inlet 9b, the backrun steam inlet. It is also equipped with an air blast inlet 9c, oil inlet 9d, blast valve 9e, stack 9f, and secondary air inlets to the carburetor and superheater (not shown). The various steam, air, and oil inlets and the stack valve are operated by suitable hydraulic cylinders or motors indicated by the reference numeral 9g. Pressure fluid to the hydraulic cylinders is supplied through pipe lines 9h, flow through which is controlled by valves 9i in the control nest 11.

The run and blow or blast control shafts of the control nest 11 are indicated by the reference characters 90 and 90a, these shafts being geared together and one being positively driven at substantially constant speed by any well-known drive. The shafts operate cams a which end the blow periods and initiate the runs and also the cams b which end the run periods and initiate the blow cycle. The cams a and b, by shifting the slide valves c in valve housings 9i, cause motor fluid supplied to the control nest at d and exhausted at e to bring about complete strokes of the pistons in the hydraulic cylinders 9g connected with the run, blast, and operating valves of the set, and operate to place them in "on" and "off" positions.

The invention is applicable to any type of gas generator or other apparatus and to any suitable type of control nest for such apparatus. Accordingly, these constructions, which are well-known in the art, are indicated on the accompanying drawings merely to the extent necessary to show the relation of the present invention thereto.

Upon the upper portion 10 of the generator is mounted a charger 12 of any suitable character but preferably of the type shown in the patent to Steere mentioned above, which includes two hydraulic cylinders or motors 13, 14 for operating the movable parts of the charger, the motor 13 operating the fuel spreader 111 in the magazine 112 of the charger and the motor 14 operating the cover or lid of the magazine of the charger as explained in the Steere patent heretofore mentioned. Pipe lines 15, 16 lead to the motor 13 and pipe lines 17, 18 lead to the motor 14 for conveying and removing the water or other operating fluid. These pipe lines include flexible or hose portions 19, 20, 21 and 22 so that the charger, which is supported by a carriage, can be moved from its position over the generator opening to give access to the interior of the generator.

The pipe lines are connected to a charger control or timing device 30 comprising a base 31 on which are mounted two reciprocating four-way valves 32, 33. Each valve consists of a cylindrical casing 34 with a middle port 35, end ports 36, 37 and intermediate ports 38, 39, the end ports being connected by a passage 40. An elongated piston 41, slidable within the cylinder, has a reduced middle portion 42 so that communication can be established between the middle port and either one of the intermediate ports, depending upon the position of the piston. A valve stem 43 extends from the piston through a stuffing box 44, and the piston travel is limited by a projection 45 extending from the piston and a collar 46 formed on the stem. An operating lever 47 is pivoted to the lugs 48 extending from the base, by a pin 49 and to a yoke 50 on the valve stem by a bolt 51. A stub shaft 52 extends from one side of the lever 47 and a roller 53 is journaled on the shaft.

The intermediate ports of the valve 32 are connected to the pipe lines 15, 16 while the intermediate ports of the valve 33 are connected to the pipe lines 17, 18. An end port of each valve is connected to a discharge line 54 and the middle port to a supply pipe 55. Since the end ports are connected by the passage 40, liquid is discharged from both end ports through the single connection 54.

The valves 32, 33 are mounted in parallel relation upon the base with the stub shafts 52 extending toward each other. Midway between the valves there extends a shaft 60 in parallel relation to the valves and supported from a housing 61 having journal bearings 62, 63 in which the shaft rotates. The housing is secured to the base 31 and encloses a worm gear 64 carried by the shaft 60 and a worm 65 engaging the gear. The drive shaft 66 of the worm connects with another similar reduction gearing enclosed in a housing 67, and the shaft 68 of the second gearing is driven by an electric motor 69.

Figure 5:
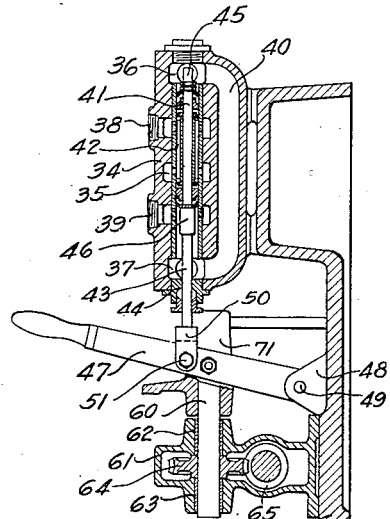
Fig. 5 is a section on the line 5—5 of Fig. 4.

The shaft 60 carries a cam 70 of a diameter sufficiently large to extend into the paths of movement of the rollers 53 connected to the valve stems. The cam comprises a hub 71 with which there are formed integrally two helical segments or blades 72, 73 of opposite pitch. These segments are spaced axially of the hub to leave a space 74 between their contiguous ends 75, 76, so that the roller 53 can pass between them. The other end 77 of the cam segment 72 is so located that upon rotation the cam surface 78 of the segment 72 will engage the roller 53 in the extreme position of the piston, as shown in Fig. 5; and the segment 72 is of sufficient extent and pitch to cause a complete travel of the piston in one direction as the surface 78 rotates in engagement with the roller 53. The other cam segment 73 is located with its surface 79 in position to engage the roller 53 as left by the segment 72, and it has a reverse pitch and an extent sufficient to return the piston to its original position as the surface 79 contacts with the roller 53.

Figure 6:
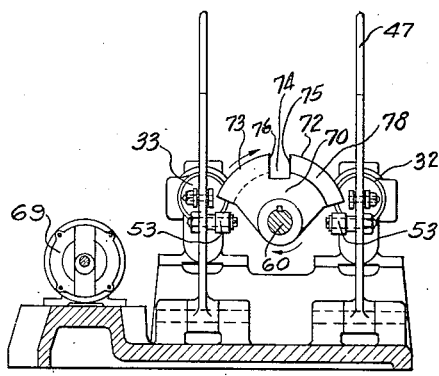
Fig. 6 is an elevation partly in section on the line 6—6 of Fig. 4.

It will be noted from Fig. 6 that cam segments 72 and 73 together subtend an arc of about 90 degrees. There is thus provided a complete back and forth reciprocation of one control during one-quarter revolution, a dwell during the next quarter revolution, and then a complete reciprocation of the other control valve during the third quarter revolution with another dwell period for the fourth quarter of each revolution of the cam shaft 60. The space 74 between the cam segments not only provides a passage between them for the roller 53 but also a sufficient time interval between the back and forth movements of the piston of the valve so that the mechanism controlled by the valve can function properly.

Upon the hub 71 of cam 70 is formed a cylindrical cam 80 having the two oppositely disposed cam surfaces 81, 82 separated by depressions 83, 84. A standard 85 threaded into the base 31 has a mercury switch support member 86 pivotally mounted at the upper end and is provided with a roller 87 adapted to contact with the cam 80. A mercury switch 88 is supported by the member 86.

The control nest 11, as usually constructed, has a shaft from which the various control elements assembled in the nest are operated. Upon this shaft 90 (Fig. 1) is fastened a split cylindrical sleeve 91 shown in detail in Fig. 3. The sleeve is provided with a wedge shaped cam surface 92, one edge 93 being parallel with the axis of the sleeve and the other edge 94 extending helically about the sleeve. A rod 95 carries a slidable clamp 96 which has pivoted thereto a supporting member 97. Member 97 supports a mercury switch 99 and has a roller 98 extending therefrom into contact with the cam surface 92.

As shown in Figs. 1 and 2 the switches 88 and 99 are connected in circuit with the electric motor 69 by conductors 100 forming a circuit indicated generally by the reference numeral 101.

The charger control is started in operation through the cam surface 92 engaging the roller 98 to lift the mercury switch and thus close the circuit to the electric motor. The motor thereupon rotates the cam shaft 60 and the cam surface 81 lifts the mercury switch 88 to also close the circuit 101. The cam surface 78 then engages the roller 53 of the valve 32 and the piston is drawn forward from the position shown in Fig. 5 to connect the supply line 55 with the pipe line 15 through the ports 35, 39, and connect the pipe line 16 with the discharge 54 through the ports 38, 36. Liquid is thus supplied under pressure to the hydraulic motor 13 through the line 15 to depress the piston contained therein, the liquid on the under side of the piston escaping through the line 16, valve ports 38, 36 and outlet pipe 54; the fuel spreader 111 is thus lowered into the generator and a charge of fuel contained in the charger is directed by the spreader into the generator. The cam surface 79 next comes into contact with the roller 53 of the valve 32 to return the valve piston and so connect the line 16 with the pressure fluid supply 55 and the line 15 with the discharge 54. The spreader is thus raised by the hydraulic motor 13 to close the bottom opening of the magazine. When the cam 70 has rotated out of contact with the roller 53 of the valve 32, the depression 83 on the cam 80 rotates beneath the switch member 86, permitting the latter to drop and thus break the circuit. However, if the other switch member 97 is still riding on the cam surface 92, the circuit remains closed and the motor continues to rotate the cam shaft 60 and so reestablishes the circuit through the switch 88 by the cam surface 82 lifting the switch member 86. The other control valve 33 is thereupon operated by the cam 70 to cause the hydraulic motor 14 to pass through a complete cycle of operation and refill the charger. If, during this operation of replenishing the charger, the cam surface 92 in the control nest allows the switch member 97 to drop and open the switch 99, the motor continues to operate, due to the maintenance of the closed circuit through the switch 88, until the cam surface 82 passes from beneath the roller 87 and the latter falls into the depression 84. With both switches open the motor stops and does not start again until the circuit is closed once more through the switch 99 in the control nest. It will be noted, however, that for each valve operation the switch 88 is maintained to close the circuit during a complete back and forth reciprocation of a control valve and therefore the hydraulic motors 13 or 14 complete their cycles at each operation.

With cam segments 72, 73, proportioned to subtend an arc of about 90 degrees, each valve stem is contacted by the cam during a quarter revolution only, and for the remaining three quarters of a revolution the valve stem is free to be reciprocated manually by the lever 47. During the dwell periods when neither stem is contacted by the cam, both valve stems can thus be manually operated. This feature is of importance as it permits the operator to control the position of the spreader, for example, to regulate the deposit of fuel in the generator to correct conditions in the fuel bed.

The sleeve cam member 91 is adjustable on the control nest shaft 90 so that the charger can be started at any desired point in the gas generator cycle. By shifting the member 97 axially along the cam 92, the number of charging operations for each cycle i. e., the air blasting cycle, or up or back-run gas making cycles of the gas generator set can be varied. For example, the wedge-shaped cam 92 can be proportioned so that with the switch at its small or narrow end, the motor will only operate one of the control valves 32 or 33 for each cycle of the generator, that is, a fuel charge will be delivered into the generator only once in every two cycles of the generator, and, with the switch at the broad end of the cam, several charges of fuel will be delivered for each two cycles of the generator operation.

In view of the wide range in the number of charges for each generator cycle permitted by the present invention, one size of charger is in practice sufficient to take care of any size generator.

The charger control is disclosed as including two four-way hydraulic valves because of the fact that the charger is provided with two hydraulic cylinders or motors. The invention, however, is applicable to a one-valve control or to a control having more than two valves by duplicating the cam structure or modifying the cam surface to accord with the disposition of the valves, as will be obvious to one skilled in the art. Furthermore, while valves are shown, other equivalent devices may be substituted where motors other than hydraulic are used for operating the charger elements.

It will of course be understood that while a specific embodiment of the invention has been shown and described, various changes in the details thereof may be made by those skilled in the art, and the invention is not to be limited to the structure disclosed, but only by the scope of the appended claims.

What is claimed is:

1. The combination with a gas generator having a control nest for automatically regulating the operation of the generator and a charger, of a control for the charger, an electric motor for operating said control, and a pair of switches connected in parallel with each other and in circuit with said motor, one of said switches being arranged to be opened and closed by the operating mechanism of the control nest and the other of said switches being arranged to be opened and closed by the charger control.

2. In combination with a gas generator having a control nest for regulating the operation of the generator, a charger, a control for said charger arranged to cause said charger to complete a predetermined number of charging operations during each cycle of operation of the generator, and means connecting the control nest with the charger control to synchronize the operation of the charger with that of the generator said control comprising means for completing a charging operation when the control nest acts to stop the operation of said charger before said operation is complete.

3. In combination with a gas generator, a control nest for automatically regulating the operation of the generator in cycles, a charger, a control for the charger, and power means connecting the control nest with the charger control for initiating one or more operations of the charger in synchronism with each cycle of the generator, said control involving means for completing an operation of the charger initiated by the control nest when the power connection between the control nest and the control for the charger is interrupted.

4. In combination with a gas generator, a control nest for automatically regulating the operation of the generator in cycles, a charger, a control for the charger, power means connecting the control nest with the charger control for initiating one or more operations of the charger in synchronism with each cycle of the generator, means in said control nest for adjusting the number of operations initiated by said control during each cycle of the generator, said control involving means for completing an operation of the charger initiated by the control nest when the power connection between the control nest and the control for the charger is interrupted.

5. In combination with a gas generator having a fuel bed therein, a control nest for automatically regulating the operation of the generator, a charger for the generator involving a magazine, means to deliver fuel to said magazine, means in said magazine for distributing fuel delivered thereto onto the fuel bed in said generator, motors for operating said means, a control for said charger governing the operation of said motors, said control involving a motor for governing the operation of said first mentioned motors, and means connecting said second mentioned motor with said control nest for synchronizing the operation of said first mentioned motors with that of the generator, said latter means being constructed and arranged so that the second-mentioned motor remains in operation to actuate the first-mentioned motors to complete their cycles of operation when the power connection between said control nest and said control for the charger is interrupted.

6. In combination with a gas generator having a fuel bed therein, a control nest for automatically regulating the operation of the generator, a charger for the generator involving a magazine, means to deliver fuel to said magazine, means in said magazine for distributing fuel delivered thereto onto the fuel bed in said generator, hydraulic motors for operating said means, a control for said charger governing the operation of said hydraulic motors, said control involving an electric motor for controlling the operation of said hydraulic motors, and means connecting said electric motor with said control nest to synchronize the operation of said hydraulic motors with that of the generator, said last-mentioned means comprising two switches in parallel with each other and in circuit with said motor.

7. In combination with a gas generator having a fuel bed therein, a control nest for automatically regulating the operation of the generator, a cam in said nest, an electric switch arranged to be opened and closed by said cam, a charger for the generator involving a magazine, means for delivering fuel to said magazine, means in said magazine for distributing fuel delivered thereto onto the fuel bed in the generator, motors for operating said means, a control for said charger involving an electric motor in circuit with said switch in said control nest, closing of said switch causing energization of said electric motor and operation of said first mentioned motors, and a second switch arranged to be opened and closed by said motor, said second switch being in parallel with the first-mentioned switch and in circuit with said motor.

8. In combination with a gas generator having a fuel bed therein, a control nest for automatically regulating the operation of the generator, a cam in said nest, an electric switch arranged to be opened and closed by said cam, a charger for the generator involving a magazine, means for delivering fuel to said magazine, means in said magazine for distributing fuel delivered thereto onto the fuel bed in said generator, hydraulic motors for operating said means, a control for said charger involving an electric motor in circuit with said switch in said control nest, valves operated by said electric motor controlling the introduction and discharge of pressure fluid into said hydraulic motors, closing of said switch causing energization of said motor and operation of said valves to regulate the introduction and discharge of pressure fluid into said hydraulic motors, and a second switch in parallel with said first mentioned switch whereby when the first mentioned switch is opened and the second switch closed, said electric motor remains energized and functions to complete the operation of said fuel delivering and distributing means.

9. The combination with a gas generator having a control nest for automatically regulating the operation of the generator and provided with an operating shaft, of a charger including a pair of hydraulic motors, a pair of reciprocating valves in parallel disposition, one for each motor and connected thereto by pipe lines, said valves having their stems extending in the same direction, projections on said stems extending toward each other and adapted to move with the stems, a shaft mounted in parallel relation midway between the stems, a cam carried by said shaft of a diameter extending into the paths of movement of said projections, said cam including a hub and helically formed segments of opposite pitch with their contiguous ends spaced axially on the hub to provide a passage for said projections, said segments together subtending an arc of about 90° and each having a sufficient pitch to cause a complete travel in one direction of the stems in the valves, an electric motor for driving said cam through interposed reduction gearing, a second cylindrical cam formed on the hub of the first cam, said second cam including two cam surfaces separated by depressions, a standard supported adjacent said second cam, a member pivoted to said standard and having a projection in contact with said second cam, a mercury switch supported on said member for movement therewith, a sleeve secured to the shaft of the control nest, said sleeve having a wedge shaped cam surface thereon, a clamp slidably supported for movement axially of said sleeve, a member pivoted to said clamp and having a projection in contact with said sleeve, a second mercury switch supported on said last mentioned member for movement therewith, and a circuit connecting the second-mentioned switch in parallel with the first-mentioned switch and in circuit with said motor.

GEO. R. STEERE.